(12) United States Patent
Emigh et al.

(10) Patent No.: US 9,154,495 B1
(45) Date of Patent: *Oct. 6, 2015

(54) SECURE DATA ENTRY

(71) Applicant: Radix Holdings, LLC, Incline Village, NV (US)

(72) Inventors: Aaron Emigh, Incline Village, NV (US); James Roskind, Redwood City, CA (US)

(73) Assignee: Radix Holdings, LLC, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,137

(22) Filed: May 3, 2014

Related U.S. Application Data

(63) Continuation of application No. 11/131,038, filed on May 16, 2005, now Pat. No. 8,719,591.

(60) Provisional application No. 60/571,017, filed on May 14, 2004, provisional application No. 60/586,249, filed on Jul. 8, 2004, provisional application No. 60/612,132, filed on Sep. 22, 2004.

(51) Int. Cl.
*H04L 29/06* (2006.01)

(52) U.S. Cl.
CPC .................................. *H04L 63/0823* (2013.01)

(58) Field of Classification Search
None
See application file for complete search history.

(56) References Cited

U.S. PATENT DOCUMENTS 6,496,930 B1 * 12/2002 Ono et al. ...................... 713/168
2006/0020812 A1 * 1/2006 Steinberg et al. ............. 713/181

* cited by examiner

*Primary Examiner* — Brandon Hoffman

(57) ABSTRACT

In some embodiments, techniques for secure data entry comprise receiving request data, requesting secure data entry via a programmatic interface, and receiving encrypted input data, wherein a key used for the encryption is associated with said identity-related data.

30 Claims, 10 Drawing Sheets

SECURE DATA ENTRY

CROSS REFERENCE TO RELATED APPLICATIONS

This application claims priority to U.S. patent application Ser. No. 11/131,038, now U.S. Pat. No. 8,719,591, entitled SECURE DATA ENTRY, filed May 16, 2005, which is incorporated herein by reference for all purposes, which claims priority to U.S. Provisional Patent Application No. 60/571,017, SECURE DATA ENTRY SERVICE, filed May 14, 2004, which is incorporated herein by reference for all purposes, and which claims priority to U.S. Provisional Patent Application No. 60/586,249, entitled WRITE-ONLY MEMORY, filed Jul. 8, 2004, which is incorporated herein by reference for all purposes, and which claims priority to U.S. Provisional Patent Application No. 60/612,132, entitled ANTI-PHISHING TECHNOLOGY, filed Sep. 22, 2004, which is incorporated herein by reference for all purposes.

FIELD OF THE INVENTION

The present invention relates generally to the area of computer security. More specifically, techniques for the secure entry of data are disclosed.

BACKGROUND OF THE INVENTION

Existing methods for providing data do not provide a guarantee of who may obtain the data. Data may be misused by a party who should not have access to the data. Examples of such data include passwords, financial identifiers such as credit card numbers and bank account numbers, and personal information such as social security numbers and driver's license numbers.

Modern computer usage requires that data be provided to a variety of entities, both local and remote, such as over the internet. This has given rise to fraudulent obtaining of data, for example via identity theft such as "phishing." Current approaches do not effectively prevent this from occurring.

It would be useful to ensure that provided data is received and/or usable only by an intended recipient of the data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a non-transitory computer readable medium such as a computer readable storage medium, or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
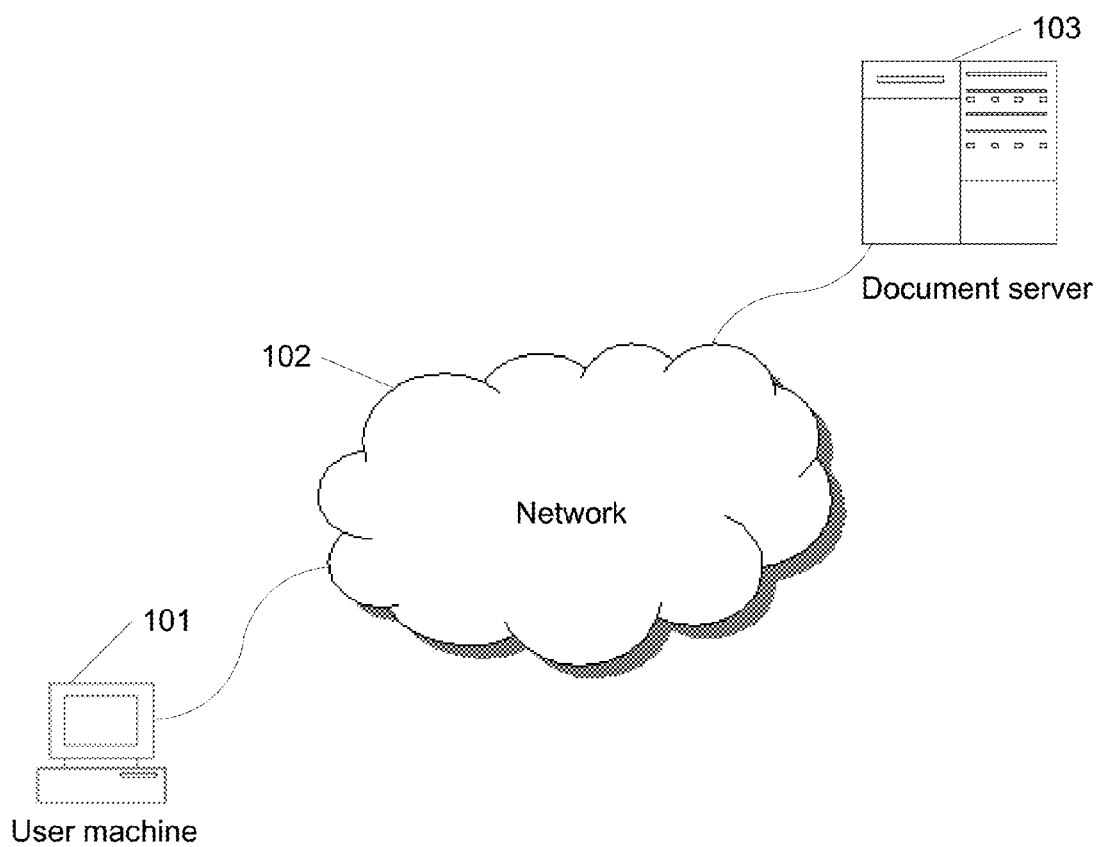
FIG. 1 is a diagram of a system for secure data entry, according to some embodiments.

FIG. 1 is a diagram of a system for secure data entry, according to some embodiments. In this example, a user machine 101 may be connected to a network 102. A user machine may be any user-operated device capable of performing programmed information processing. Examples of a user machine include a personal computer, a PDA, an internet appliance, and a cell phone. It will be readily appreciated by those skilled in the art that such embodiments of user machines 101 may include a memory that provides instructions to a hardware processor that is configured to perform operations corresponding to such instructions. In some embodiments, a user machine 101 may receive a document through the network 102 from a document server 103. Examples of a document include a web page, a document in a page description language such as a PDF, a word processing document, a database document and a spreadsheet. A document may include an embedded request for secure data entry.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet.

A document server 103 may be connected to the network 102. The document server 103 may be any entity capable of providing a document, such as a web server that provides a document through a protocol such as HTTP. The document server 103 may provide a document that includes an embedded request for secure data entry. A document refers herein to any data that may be referenced by an address, including a file on a computer filesystem, an entry in a database table, a web page, and dynamically generated data provided by a server such as an HTTP server.

Figure 2:
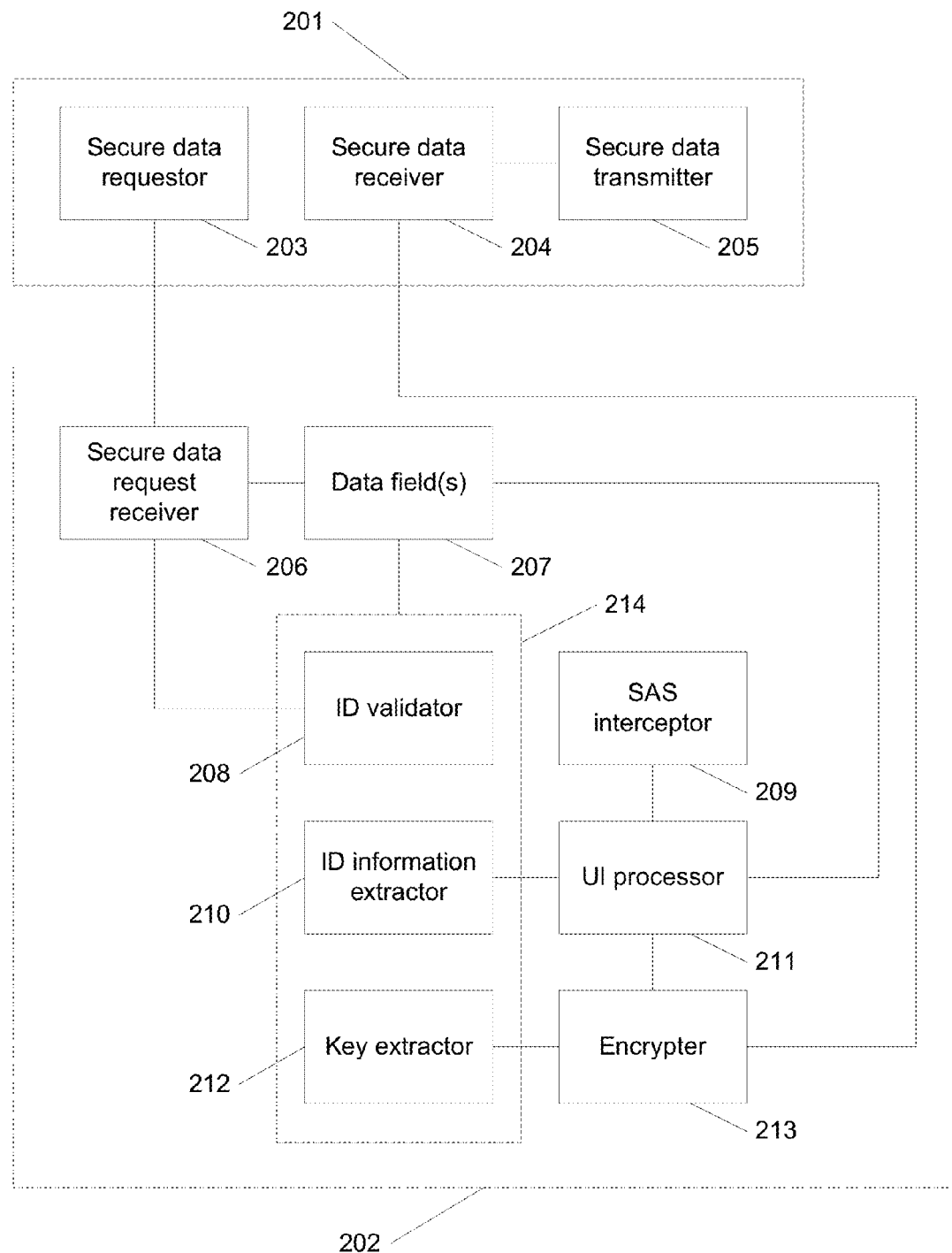
FIG. 2 is a diagram of a system for processing secure data entry, according to some embodiments.

FIG. 2 is a diagram of a system for processing secure data entry, according to some embodiments. In this example, a secure data entry requestor 201 requests secure data entry from a secure data entry provider 202. In some embodiments, a secure data entry requestor 201 and a secure data entry provider 202 may be associated with a user machine such as user machine 101 of FIG. 1. In some embodiments, a secure data entry requestor 201 may be associated with a document browser such as a web browser. In some embodiments, a secure data entry requestor 201 may be associated with an application program. In some embodiments, a secure data entry provider 202 may be associated with an operating system such as Windows, Unix, Linux, or MacOS. In some embodiments, a secure data entry provider 202 may be associated with a document browser such as a web browser. Examples of a secure data entry requestor 201 are discussed in conjunction with FIG. 4. Examples of a secure data entry provider 202 are discussed in conjunction with FIGS. 5 and 8.

A secure data requestor 203 may request that secure data entry be performed, for example by making an operating system call or a call to an application program interface, herein referred to as an API. An example of a secure data requestor 203 is discussed in conjunction with 403 of FIG. 4. A secure data receiver 204 may receive data that has been securely entered, for example through a callback function, a result returned from an API call, retrieving data from a predetermined or specified location, or any other way that data may be provided. A secure data transmitter 205 may transmit data that has been securely entered to a location associated with an owner of the data, such as a URL. In some embodiments (not shown), a secure data transmitter 205 may be associated with a secure data entry provider 202.

A secure data request receiver 206 may receive a specification for secure data entry, for example from a secure data requestor 203. A request for secure data entry may include identity information such as an X.509 certificate, for example as specified in section 4 of IETF RFC 3280, available from the Internet Engineering Task Force, and may include information associated with data for which secure data entry is requested, such as specifications of one or more data fields 207. Examples of receiving a request for secure data entry are discussed in conjunction with 501 of FIGS. 5 and 801 of FIG. 8. One or more data fields 207 may be retained for presentation and input, for example in memory.

A request analyzer 214 may include components that extract and/or analyze request data such as identity information. An ID validator 208 may determine whether an identity associated with the request is valid. An example of determining whether an identity is valid is to determine whether an X.509 certificate specifying an identity contains a valid cryptographic signature from a trusted certificate authority. Another example of determining whether an identity is valid is to consult a reputation service.

An ID information extractor 210 may extract displayable ID information. An example of displayable ID information is a name associated with an entity associated with identity information, such as the "subject name" in an X.509 certificate. Another example of displayable ID information is a logotype and/or audio data associated with an entity associated with identity information, such as a "subject organization logotype" associated with an X.509 certificate, for example as specified in IETF RFC 3709, available from the Internet Engineering Task Force. In some embodiments, an ID information extractor 210 may obtain ID information from a reputation service.

A key extractor 212 may extract cryptographic key information, for example a public half of a public/private key pair or a key to be used in a keyed cryptographic hash. An example of cryptographic key information is the "subject public key info" field of an X.509 certificate. In some embodiments, a key extractor 212 may obtain cryptographic key information from a reputation service.

In some embodiments, a secure attention sequence (SAS) interceptor 209 may intercept a SAS. An example of a SAS is a predetermined or configurable input such as a key, key combination or sequence, for example CTRL-ALT-DEL. Another example of a SAS is an event from a separate input device, for example a button or an attachment to another device such as a mouse or monitor. In some embodiments, a SAS interceptor may be associated with a keyboard driver, a GINA (Windows Graphical Identification aNd Authentication dynamically-linked library) or a SAK (Linux Secure Attention Key). Details on writing keyboard drivers, GINAs and SAK handlers are well known to those skilled in the art, and are available from operating systems vendors such as Microsoft. In some embodiments, a SAS interceptor may be associated with an application program, or a component of an application program such as a keyboard event handler.

A UI processor 211 may provide a user interface, which may include identity-related information such as displayable information extracted by an ID information extractor 210, and which may include one or more data fields 207, which may provide a way for a user to securely enter one or more inputs. In some embodiments, a UI processor 211 may provide a user interface associated with reserved real estate.

In some embodiments, an encrypter 213 may encrypt data. Data that may be encrypted includes data that has been input into the UI processor 211, and optionally predetermined data that may be associated with data fields 207. In some embodiments, an encrypter 213 may encrypt data using one or more keys provided by a key extractor 212, and/or one or more keys associated with data fields 207. In some embodiments, an encrypter 213 may combine data fields prior to encrypting, for example by combining input data with static data. An encrypter 213 may provide encrypted data to a secure data receiver 204.

Figure 3:
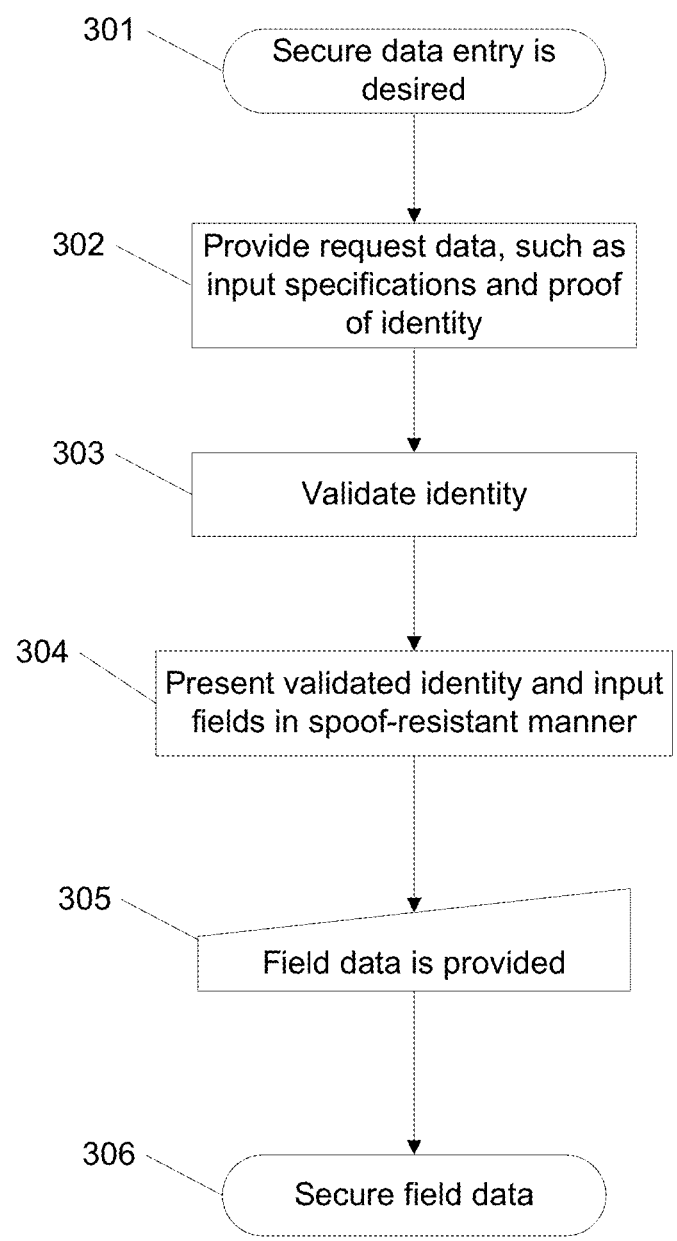
FIG. 3 is a flow diagram of a method for secure data entry, according to some embodiments.

FIG. 3 is a flow diagram of a method for secure data entry, according to some embodiments. In this example, secure data entry is desired (301). An example of a reason secure data entry may be desired is because a document such as a web page has specified secure data entry. One example of a document specification of secure data entry is for an element of a document, such as an element associated with a script such as a Javascript, to programmatically request secure data entry, for example through a programmatic interface such as an ActiveX component. Another example of a document specification of secure data entry is a semantic indication that a field contains confidential data, such as a password, which may for example be indicated via an <INPUT TYPE="password" . . . > field in an HTML document. Another example of a reason secure data entry may be desired is because an application desires secure data entry. An example of an application that may desire secure data entry is an application that requires confidential information, such as a password, or a password to an external service. An example of an application that may require a password to an external service is an application that manages finances, such as Quicken, which may for example use banking and/or brokerage account information.

Request data may be provided (302). Request data refers herein to information associated with a request for secure data entry, such as one or more input specifications and a proof of identity and/or data destination. An input specification refers herein to any specification of one or more data fields that may be input. An example of an input specification is a formatted list of one or more input field names, prompts, default values, selectable options and/or one or more restrictions on inputs such as minimum and/or maximum length, allowable characters, font(s), how to display characters during typing, and validation parameter(s) and/or script(s). Another example of an input specification is a specification for an input from a hardware authentication device, such as a time-varying key generator or a biometric device such as a fingerprint scanner. Another example of an input specification is a challenge, for example a challenge to provide a specified aspect of biometric information such as fingerprint information, or to prove possession of a cryptographic key, for example by encrypting provided text using the key, or to prove possession of a shared secret key, for example by cryptographically hashing provided text in conjunction with the shared secret key. Another example of an input specification is a reference to stored information such as information related to the identity of the party of whom secure data is requested, such as a name, address, account name or password. In some embodiments, visual appearance of an input specification may be specified, for example using a document description language such as HTML or Postscript.

A proof of identity refers herein to any way that an identity of a requestor of secure data can be established. An example of a proof of identity is a certificate that indicates an identity, which has been cryptographically signed by a trusted party. An example of a certificate is an X.509 certificate, details of which are available from the International Telecommunications Union and in IETF RFC 3280, section 4, which is available from the Internet Engineering Task Force. An example of a trusted party is a party on a list of trusted parties or who can demonstrate a link to a trusted party, for example by demonstrating that trust has been transitively conferred from a trusted root certification authority. In some embodiments, a system-wide trusted root certification authority may be used, which may for example specify a set of one or more authorities trusted to sign a certificate usable for secure data entry. In some embodiments, a private trusted root certification authority list or trusted certification authority list may be used, which may have fewer or different members than the system-wide trusted root certification authority list. In some embodiments, a system-wide trusted root certification authority list may be used and some subset of those authorities may be tagged for use in proving identity in this application, including for example using tags analogous to a code signing attribute or a SSL authentication attribute. In some embodiments, a certificate may include a destination address for securely entered data, such as a URL.

In some embodiments, a certificate may include a cryptographic key, for example the public half of a public/private key pair. Such a key may, for example, be included as a "subject public key" in an X.509 certificate. In some embodiments, a certificate may include a displayable logotype or a reference to a displayable logotype, for example as discussed in IETF RFC 3709, available from the Internet Engineering Task Force. An RFC 3709 logotype may be included as a "subject organization logotype" as specified in section 4 of RFC 3709. In some embodiments, a certificate may include an audible name or a reference to an audible name, for example as described in RFC 3709. In some embodiments, a reference to external information such as a logotype of audible name may also include a characterization of the external information that may be used to ensure that the external information is valid, such as a one-way hash of the external information. In some embodiments, a certificate may include information related to the validity of data destination addresses, such as a valid data destination address or a pattern such as a regular expression against which a data destination address can be checked to determine its validity. In some embodiments, a certificate may include information related to the validity of requested input fields, for example by providing an enumeration of allowed field names and/or characteristics. Another example of a proof of identity is a destination data address such as a URL, which may for example be used as a proof of identity in embodiments in which a reputation service is used, and/or data transmission is performed as described in conjunction with 306.

One example of providing request data is to pass it through an API to an application. An example of passing request data through an API to an application is for a component associated with a document browser to determine that a document contains a predetermined indicator that secure data entry is desired, and to make the request with request data associated with the document, for example by calling another component associated with the document browser. Another example of providing request data is to provide it to an operating system, for example via an operating system call. Another example of providing request data is to provide it to a system component such as a device driver or a registered system service.

The provided identity may be validated (303). An example of validating an identity is to verify that a cryptographic signature on a provided certificate is valid, and corresponds to a trusted party. In some embodiments, a demonstration of validity may be performed, such as challenging the party requesting secure data entry. An example of challenging the party requesting secure data entry is to provide text to the party, receive encrypted text back, decrypt the text using the public key associated with the certificate, and verify that the decrypted text is the same as the text that was sent. In some embodiments, challenge text provided to the party may include information associated with a communications channel, including for example a source IP address, a destination IP address, a time/date stamp, or information derived from a channel, such as an SSL communication channel.

In some embodiments, validating an identity may include checking a data destination address, such as a URL, and determining whether the data destination address is known to be legitimate, or is not known to be illegitimate. An example of validating a data destination address is to determine whether it is known by a reputation service, which may for example be queried over a network such as the internet. In some embodiments, a reputation service may provide other identity information, such as a logotype associated with the identity and/or a public cryptographic key associated with the entity. In some embodiments, a reputation service may be operated locally, or data associated with a reputation service may be cached locally. Another example of validating a data destination address is to determine whether it is permitted by a specification associated with a certificate or reputation service. In some embodiments, one or more input specifications may be validated, for example by determining whether they are permitted by a specification associated with a certificate or reputation service.

A validated identity and one or more input fields corresponding to the provided input specification(s) may be presented in a spoof-resistant manner (304). One example of a spoof-resistant manner is to receive a secure attention sequence (SAS) and present a user interface element such as a window, or permit input in a previously displayed input area, in response. Another example of a spoof-resistant manner is to present the input field(s) in a reserved area on a display such as a screen, for example an area that is used only for secure data entry. Another example of a spoof-resistant manner is to activate an indicator that secure data entry is being performed, such as a light or alphanumeric display on a keyboard or computer. Another example of a spoof-resistant manner is to present a special user interface element such as a window, with a visual characteristic such as a particular border color that applications are not permitted to mimic. Another example of a spoof-resistant manner is any scheme used by a Trusted Computing system to provide visual indication of trusted code. Examples of Trusted Computing systems include systems conforming to the various TCG specifications, such as the TCG Architecture Overview, published by the Trusted Computing Group. In some embodiments, presenting in a spoof-resistant manner may include preventing applications from modifying or overlapping displayed information.

Field data corresponding to the input fields may be received (305). An example of receiving field data is to receive one or more inputs from the user, with an indication that the user has completed data entry.

Field data may be secured (306). One example of securing field data is to encrypt the field data, for example using a public key associated with the identity. In some embodiments, additional data may be encrypted with field data. Examples of additional data include other data presented to the user, a date time stamp, and a pseudo random value provided with the request for secure data. An example of other data presented to the user is a specification of a transaction for which the information is being acquired, for example an amount of a transaction for which a credit card is being acquired. In some embodiments, some or all such additional data may be authenticated cryptographically before being encrypted with the field data. One example of a public key associated with the identity is a public key associated with a certificate. Another example of a public key associated with the identity is a public key obtained from a reputation service. Another example of a public key associated with the identity is a public key associated with a destination address or other characteristic of the identity via identity-based encryption. Identity-based encryption techniques are well known to those skilled in the art, and may for example be found in Boneh and Franklin, "Identity Based Encryption from the Weil Pairing," SIAM J. of Computing, Vol. 32, No. 3, pp. 586-615, 2003.

Another example of securing field data is to hash the field data, for example by hashing a password field together with a characteristic of the destination address, such as a domain name associated with the destination address. An example of such a password hashing operation is provided in Blake Ross, Nick Miyake, Robert Ledesma, Dan Boneh and John Mitchell, "A 'Simple' Solution to the Unique Password Problem," presented at the 2004 Annual Stanford Affiliates' Meeting and available from Stanford University. Encrypted field data may be provided to an entity such as the entity that requested secure data entry. Another example of securing field data is to transmit the field data to the data destination address. In some embodiments, after encrypting or transmitting field data, unencrypted field data may be overwritten in memory, for example by setting memory associated with unencrypted field data to a predetermined value such as zero.

Figure 4:
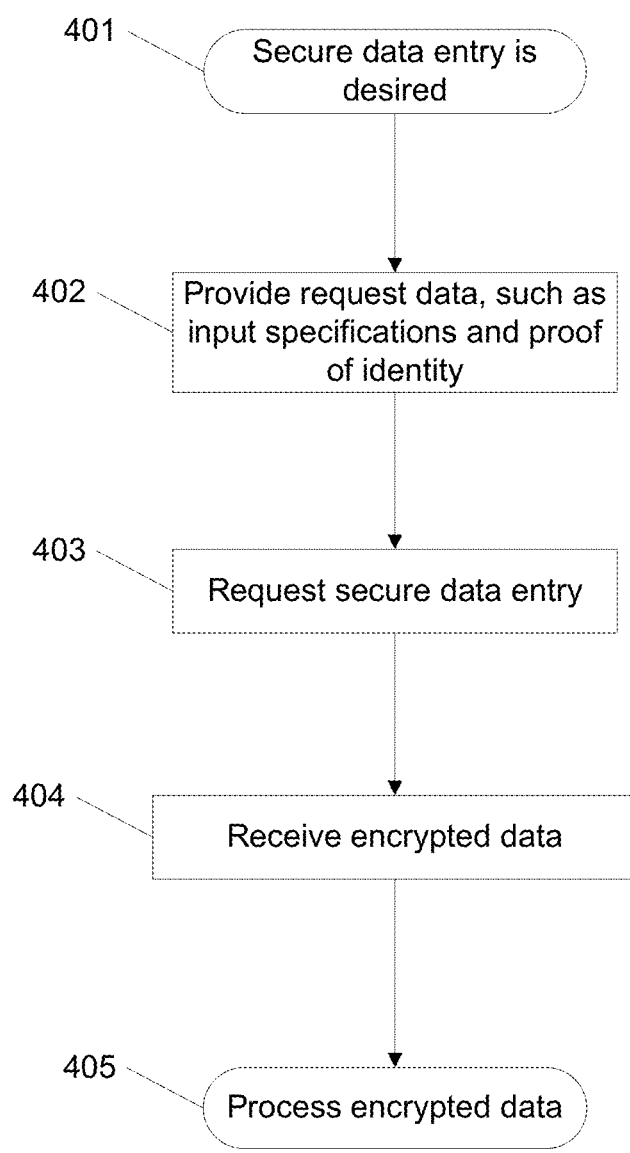
FIG. 4 is a flow diagram of a method for requesting and receiving secure data entry, according to some embodiments.

FIG. 4 is a flow diagram of a method for requesting and receiving secure data entry, according to some embodiments. In this example, secure data entry is desired (401). Examples of reasons secure data entry may be desired are discussed in conjunction with 301 of FIG. 3.

Request data may be provided (402). Request data refers herein to information associated with a request for secure data entry, such as one or more input specifications and a proof of identity and/or optional data destination, for example as discussed in conjunction with 302 of FIG. 3. In this example, providing request data may include gathering data and preparing it for a programmatic call, for example by filling a predetermined data structure with the request data.

Secure data entry may be requested (403). One example of requesting secure data entry is to make an operating system call. Another example of requesting secure data entry is to make a call into an application programming interface (API) associated with an application program such as a document browser. Another example of requesting secure data entry is to call a system component such as a device driver component, registered system service, or any other component accessible through a programmatic interface. A request for secure data entry service may include request data. In some embodiments, a request may be received as described in conjunction with 501 of FIG. 5 or 801 of FIG. 8. Request data may include a cryptographic key. In some embodiments, a cryptographic key may include the public half of a public/private key pair, for example a public key associated with a cryptographically signed certificate. In some embodiments, a cryptographic key may include a key used for a keyed cryptographic hash, for example a domain name associated with a data destination. In some embodiments, request data may include a callback function or a reference to a callback function.

Encrypted data may be received (404). An example of receiving encrypted data is to receive the data in response to a request for secure data entry, such as the request described in conjunction with 403. Examples of returning data associated with a request for secure data entry are discussed in conjunction with 509 of FIGS. 5 and 807 of FIG. 8. An example of receiving data in response to a request is to receive the data, or a reference to the data, as a return value to a call. Another example of receiving data in response to a request is to receive the data in a predetermined location, or a specified location in an event that is passed to the requestor. Another example of receiving data in response to a request is to receive the data, or a reference to the data, in an argument to a callback function provided with the request. Another example of receiving data in response to a request is to initiate a call to retrieve the data. Encrypted data may be associated with data entered by a user, for example such data encrypted using a public key or used in a keyed hash.

Encrypted data may be processed (405). One example of processing encrypted data is to transmit the encrypted data to a data destination. Another example of processing encrypted data is to store the encrypted data. Another example of processing encrypted data is to decrypt the encrypted data. Another example of processing encrypted data is to verify that additional data specified for encryption with user supplied data is correctly present.

Figure 5:
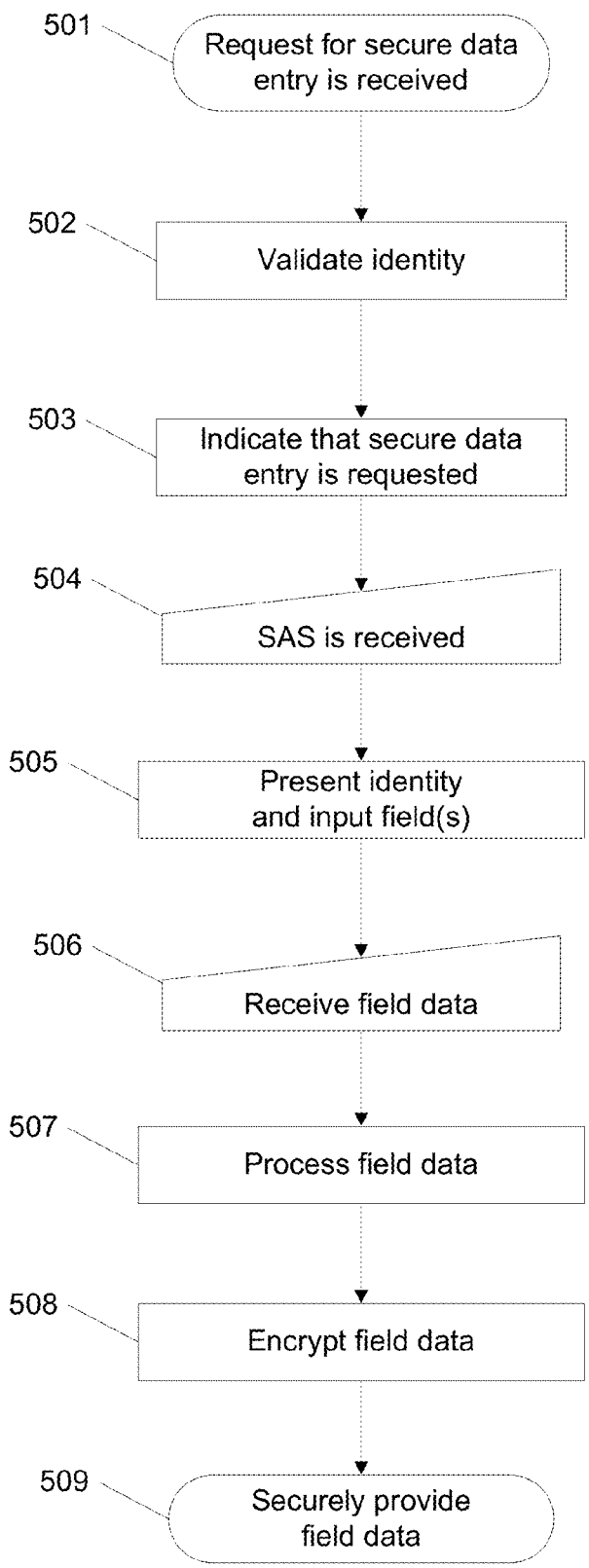
FIG. 5 is a flow diagram of a method for processing a request for secure data entry using a secure attention sequence, according to some embodiments.

FIG. 5 is a flow diagram of a method for processing a request for secure data entry using a secure attention sequence, according to some embodiments. In this example, a request for secure data entry is received (501). Examples of receiving a request for secure data entry include handling an operating system call, handling a call to a system service and handling a call to an application program through an API. In some embodiments, a request may have been made as described in conjunction with 403 of FIG. 4. A request may include request data such as information, and/or one or more references to information, relating to identity and to one or more input fields. Examples of input fields and identity-related information such as data destinations and certificate-based proofs of identity are discussed in conjunction with 302 of FIG. 3.

Request data, and optionally caller characteristic data, may be stored, for example in a secure data parameter area. A secure data parameter area refers herein to any memory, including RAM, virtual memory, flash memory, magnetic memory or optical memory, that may be used to store request data. In some embodiments, there may be a single secure data parameter area. In some embodiments, there may be more than one secure data parameter area, for example a predetermined number or one per active request for secure data entry. An example of caller characteristic data is a characteristic of the computer program making the request, such as a process identifier.

A provided identity and/or other request data may be validated (502). Examples of validating request data, including an identity, are discussed in conjunction with 303 of FIG. 3.

Figure 6:
FIG. 6 is an illustrative example of a user interface element for indicating that secure data entry has been requested, according to some embodiments.

In some embodiments, an indication may be provided that secure data entry has been requested (503). An example of an indication that secure data entry has been requested is a user interface element such as a window. An example of a window providing an indication that secure data entry has been requested is illustrated in FIG. 6. In some embodiments, a user interface element may include informational text indicating that data entry has been requested, identity-related information such as a requestor name and/or logotype, and/or instructional text informing the user how to provide a secure access sequence (SAS).

A secure access sequence (SAS) may be received (504). Examples of a SAS are discussed in conjunction with SAS interceptor 209 of FIG. 2. In some embodiments, a SAS may be received by a device driver such as a keyboard driver. In some embodiments, a SAS may be received by an operating system component or installed component such as a Windows GINA or a Linux SAK handler. In some embodiments, a SAS may be received by an application program, for example by an event handler.

In some embodiments, it may be determined whether a request for secure data entry was previously received, for example as described in conjunction with 501. Such a determination may, for example, be made on the basis of the presence of data related to a request for secure data entry in a secure data parameter area. If it is determined that a request was received, then in this example data may be retrieved from the secure data parameter area. If it is determined that no request was made, then in this example the SAS may be handled normally, for example by passing it through to another handler, by taking no action, or by presenting a system menu such as a shutdown/logout menu and/or a task manager.

Information related to the identity of the requestor and/or data recipient, and one or more input fields, may be presented (505). Such information may be associated with the request data, as discussed in conjunction with 501. An example of presenting identity-related information and input fields is to present a user interface element containing such information, for example a window such as the window illustrated in FIG. 7. In some embodiments, presenting the identity-related information and input fields may include rendering a specification of its visual appearance, for example using HTML. In some embodiments, presenting the identity-related information and input fields may include constructing an element that allows a user to determine whether to authorize the release of stored identity-related information, such as a name, address, account name or password. In some embodiments, when such a user interface element is presented, programs may be prevented from modifying the computer display, for example by rejecting or queuing requests to modify the display, or by suspending or terminating one or more processes. In some embodiments, scripts associated with a description of input fields, such as Javascript scripts in an HTML form description, may be prevented from modifying the visual appearance, for example by not allowing them to run, or by disallowing changes to the document object model (DOM).

An opportunity for data entry may be provided, for example by allowing a user to enter, select and/or manipulate data with one or more input devices such as a keyboard and/or a pointing device such as a mouse. Field data may be received (506), for example when it is indicated that data entry is complete. An example of indicating that data entry is complete is when a user interface element that terminates input is selected, such as a button labeled "Done" or "Next," or a selector that has been explicitly or implicitly designated as providing a final input. In some embodiments, field data may be received from an external device, such as a hardware authentication device that may, for example, automatically provide an identifier. Examples of hardware authentication devices include time-variant code generators and biometric devices such as fingerprint scanners. In some embodiments, a field input may be provided in the form of a response to a challenge that was posed in the request data. An example of a response to a challenge is a characterization of biometric information such as fingerprint information that corresponds to the challenge. Another example of a response to a challenge is to encrypt text associated with the challenge using a cryptographic key.

Field data may be processed (507). An example of processing field data is to pre-encrypt data. An example of pre-encrypting data is to encrypt one or more elements of field data with a specified key, for example a public key belonging to an entity other than the requestor. Such a key may, for example, be specified in conjunction with one or more fields. In some embodiments, prior to pre-encrypting data, two or more data fields may be combined together. For example, a user-input field such as a credit card number may be combined with a predetermined field such as a field associated with a policy statement, and the combined fields may be pre-encrypted with a specified cryptographic key, which may for example be associated with a third-party entity such as a payment processor. As an example of such an embodiment, a web page for Example, Inc. may securely request a credit card number and specify a private key associated with a credit card processor for Example, Inc. in conjunction with the credit card input field(s). A policy statement may be provided, for example in an invisible field, stipulating that charges to the card are to be permitted only when initiated by Example, Inc. These fields may be combined together and encrypted using the specified payment processor public key.

Field data may be encrypted (508). An example of encrypting field data is to encrypt it using a public key, for example a public key provided in a cryptographically signed certificate or from a reputation service, for example as discussed in conjunction with 501. In some embodiments, additional data, for example as discussed in conjunction with FIG. 3, may be encrypted in conjunction with the field data. One example of encrypting data using a public key is to directly encrypt the data using a public-key encryption algorithm such as RSA. Such algorithms are widely known to those skilled in the art. Another example of encrypting data using a public key is to generate a key for a symmetric cipher, for example randomly, encrypt that key using a public-key encryption algorithm such as RSA, encrypt the field data using a symmetric cipher with the symmetric key, and associate the encrypted symmetric key with the encrypted field data. Symmetric ciphers, such as AES, DES, IDEA and Triple-DES, as well as the use of stream ciphers such as RC4 as symmetric ciphers, are well known to those skilled in the art.

Field data may be securely provided (509). In some embodiments, field data may be provided in encrypted form, for example after encrypting as described in conjunction with 508. An example of providing encrypted field data is to return it to the requestor who requested secure data entry as described in conjunction with 501. One example of returning the data is to place it in a secure data parameter area (which may be the same as or different than the secure data parameter area discussed in conjunction with 501 and 504), and optionally signal the requestor that the data is available, for example by passing an event or signal to the requestor. In some embodiments, caller characteristic information such as that discussed in conjunction with 501 may be associated with the secure data parameter area. In some embodiments, the secure data parameter area may be readable to the caller. In some embodiments, information associated with the secure data parameter area may be made available via handling a second call and returning a result. In some embodiments, a characteristic of a caller, such as a process identifier, may be verified prior to providing data associated with the secure data parameter area, for example by determining whether the process identifier of the caller matches a process identifier associated with the secure data parameter area. Another example of returning the data is to provide a return value associated with the data, for example including the data or a reference to the data. Another example of returning the data is to provide an argument associated with the data, for example including the data or a reference to the data, to a callback function that was provided by the requestor in 501.

In some embodiments, securely providing field data may include transmitting field data to a data destination, for example a data destination described in conjunction with 502. In such embodiments, transmitted data may optionally be encrypted, for example as described in conjunction with 508 or by transmitting the field data using SSL/TLS.

FIG. 6 is an illustrative example of a user interface element for indicating that secure data entry has been requested, according to some embodiments. Such a user interface element may, for example, be displayed as described in conjunction with 503 of FIG. 5. In this example, a window 601 includes information relating to secure data entry. The window 601 may include an informational notice 602 that informs the user that secure data entry has been requested. The window 601 may also include identity-related information 603, in this example an eBay logotype. In some embodiments, a name associated with the requestor may be displayed. Such identity-related information may, for example, be associated with a cryptographically signed certificate, or a reputation service. The window 601 may also include an instructional notice 604 informing the user how to provide a secure attention sequence (SAS). An option to cancel secure data entry 605 is also provided in this example.

Figure 7:
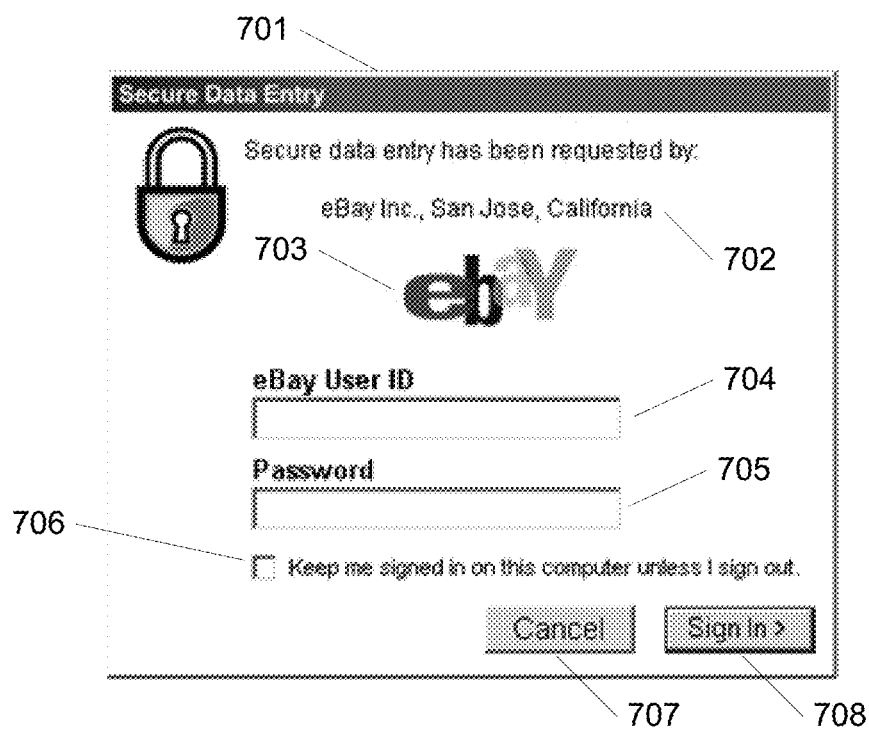
FIG. 7 is an illustrative example of a user interface element for receiving secure data, according to some embodiments.

FIG. 7 is an illustrative example of a user interface element for receiving secure data, according to some embodiments. Such a user interface element may, for example, be displayed as described in conjunction with 505 of FIG. 5. In this example, a window 701 includes information and input fields associated with secure data entry. The window 701 may include an identification of the secure data requestor 702, which may for example be associated with a cryptographically signed certificate or a reputation authority. The window 701 may include a logotype associated with the secure data requestor 703, which may for example be associated with a cryptographically signed certificate or a reputation authority. In some embodiments, an auditory identification of the secure data requestor may be presented. Input fields 704, 705, 706 correspond to data requested for secure entry. In this example, the fields are labeled "eBay User ID" 704, "Password" 705 and "Keep me signed in on this computer unless I sign out" 706, and are associated with a text input field, a password input field with a masked input, and a checkbox input respectively. In this example, buttons labeled "Cancel" 707 and "Sign In>" 708 are shown. In this example, the "Cancel" button may cancel the secure data entry, and the "Sign In>" button may terminate input and pass the input to the next stage of processing, such as processing and/or encryption, for example as described in conjunction with 507 and 508 of FIG. 5, or 805 and 806 of FIG. 8, respectively. In some embodiments, such buttons, or buttons similar to them, may be a standard element. In some embodiments, such buttons may have configurable characteristics such as a label.

Figure 8:
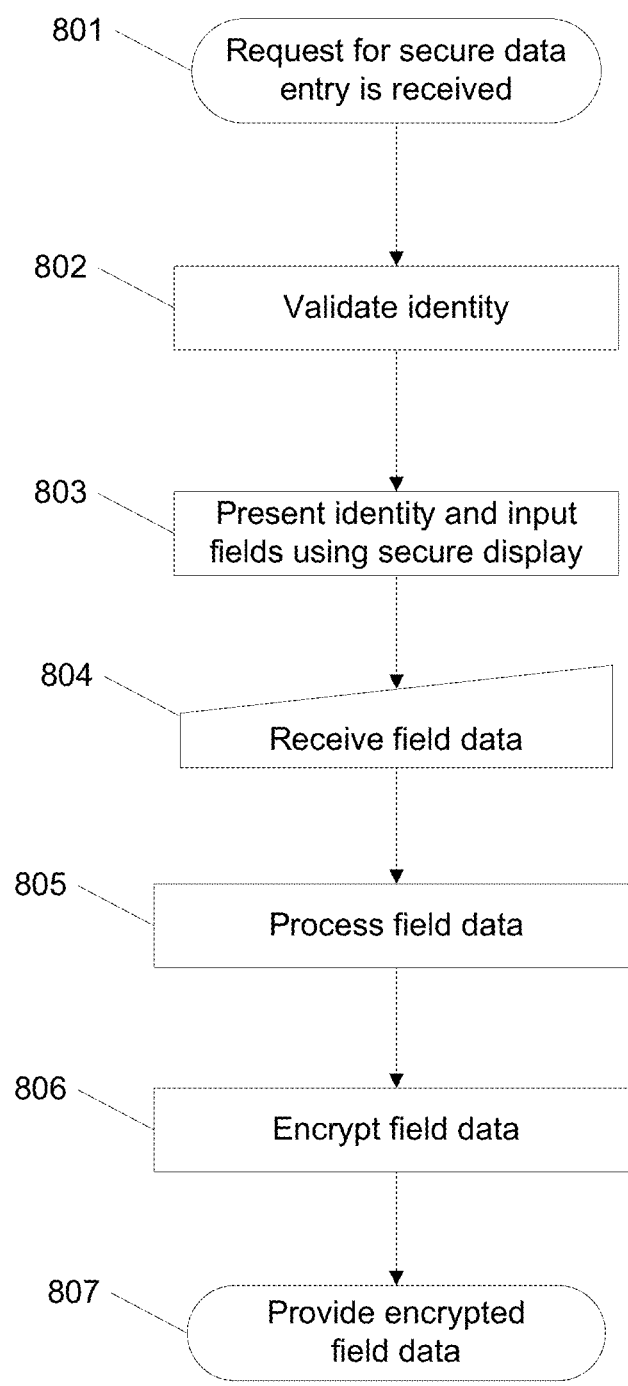
FIG. 8 is a flow diagram of a method for processing a request for secure data entry using a secure display, according to some embodiments.

FIG. 8 is a flow diagram of a method for processing a request for secure data entry using a secure display, according to some embodiments. In this example, a request for secure data entry is received (801). Examples of receiving a request for secure data entry include handling an operating system call, handling a call to a system service and handling a call to an application program through an API. In some embodiments, a request may have been made as described in conjunction with 403 of FIG. 4. A request may include request data such as information, and/or one or more references to information, relating to identity and to one or more input fields. Examples of input fields and identity-related information such as data destinations and certificate-based proofs of identity are discussed in conjunction with 302 of FIG. 3.

A provided identity and/or other request data may be validated (802). Examples of validating request data, including an identity, are discussed in conjunction with 303 of FIG. 3.

Figure 9:
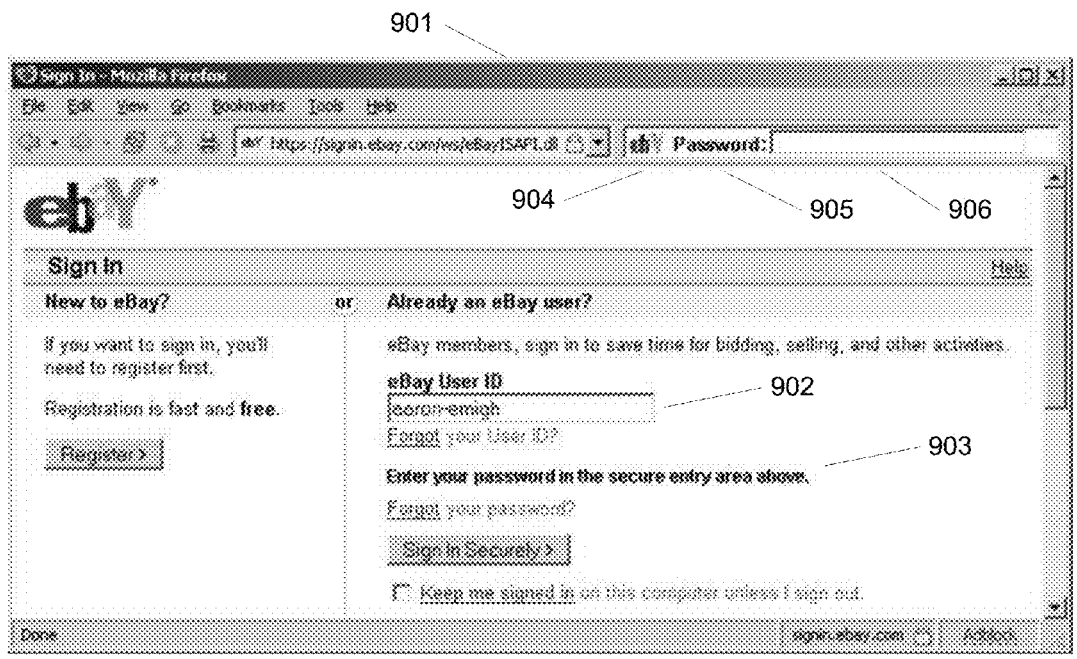
FIG. 9 is an illustrative example of a user interface for secure data entry, according to some embodiments.
Figure 10:
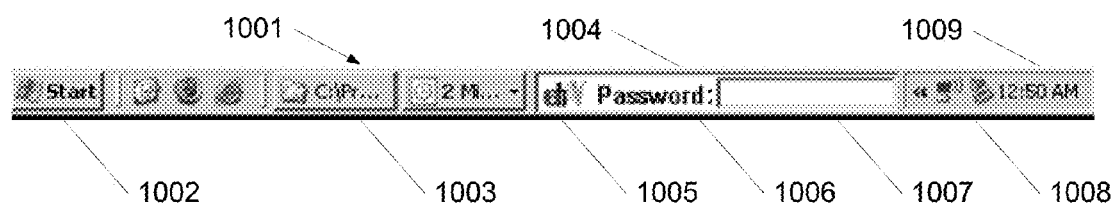
FIG. 10 is an illustrative example of a user interface for secure data entry, according to some embodiments.

Information related to the identity of the requestor and/or data recipient, and one or more input fields, may be presented using a secure display (803). Such information may be associated with the request data, as discussed in conjunction with 801. An example of a secure display is a display area reserved by an operating system, for example as illustrated in FIG. 10. Another example of a secure display is a display area reserved by an application program, for example as illustrated in FIG. 9. Another example of a secure display is an external indication of secure data entry, such as an indicator associated with a keyboard, computer or monitor that secure data entry is being performed. In some embodiments, such an external indicator may include identity-related information such as a name or logotype associated with a requestor. A reserved display area may be protected, for example by preventing unauthorized programs or scripts from modifying or overlapping the display area.

Information related to identity and one or more input fields may be presented, and an opportunity for data entry may be provided, for example by allowing a user to enter, select and/or manipulate data with one or more input devices such as a keyboard and/or a pointing device such as a mouse. Examples of presenting information and allowing user input are discussed in conjunction with 505 of FIG. 5. Field data may be received (804), for example as discussed in conjunction with 506 of FIG. 5.

Field data may be processed (805). Examples of processing field data are discussed in conjunction with 507 of FIG. 5. Field data may be encrypted (806). Examples of encrypting field data are discussed in conjunction with 508 of FIG. 5.

Field data may be securely provided (807). Examples of securely providing field data are discussed in conjunction with 509 of FIG. 5.

FIG. 9 is an illustrative example of a user interface for secure data entry, according to some embodiments. The user interface of FIG. 9 may, for example, be presented as described in conjunction with FIG. 8. In this example, a window 901 associated with an application such as a browser may include one or more unsecured data fields 902, and may include instructional text 903 instructing a user to enter one or more fields in a reserved area 904. The reserved area 904 may include identity-related information such as a logotype 904, and one or more data fields 906 and associated labels 905. In this example, the logotype 904 indicates that data will be securely entered for eBay, and the field 906 is labeled "Password" 905.

FIG. 10 is an illustrative example of a user interface for secure data entry, according to some embodiments. The user interface of FIG. 10 may, for example, be presented as described in conjunction with FIG. 8. In this example, an area reserved by the operating system, such as a taskbar 1001, may include an area for secure data entry. In some embodiments, such an area may always be present. In some embodiments, such an area may be dynamically created in a spoof-resistant manner, for example by including it in an area that an application program cannot modify, or cannot modify in an unrestricted manner. In this example, the taskbar 1001 includes normal taskbar information such as a start button 1002, running tasks 1003, system tray icons 1008 and a clock 1009. In addition, a secure data entry area 1004 includes identity-related information such as a logotype 1005, an input field label 1006 and an input field 1007. In this example, the secure data entry is associated with eBay 1005, and the input field 1007 is labeled "Password" 1006. Such a secure data entry area may include an accept button (not shown), or may accept input when a predetermined key such as ENTER is pressed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving request data, wherein said request data includes identity-related information relating to a provider of said request data and information relating to an input specification;
at a computing device, requesting secure data entry via a programmatic interface; and
receiving input data, wherein said input data is associated with said input specification, wherein said input data is encrypted, and wherein a key used for said encryption is associated with said identity-related information.

2. The method of claim 1, wherein said programmatic interface is associated with an operating system call.

3. The method of claim 1, wherein said programmatic interface is associated with an API.

4. The method of claim 1, wherein said programmatic interface is associated with a specification in an electronic document.

5. The method of claim 1, wherein said key is a public key, and wherein said input data is encrypted with public-key encryption using said key.

6. The method of claim 1, wherein said key is a public key, and wherein said input data is encrypted with symmetric encryption using a second key, wherein said second key is encrypted with public-key encryption using said key, and wherein said encrypted second key is received with said input data.

7. The method of claim 1, wherein said identity-related information is associated with a cryptographically signed certificate.

8. The method of claim 1, wherein said input specification includes HTML.

9. The method of claim 1, wherein said input specification includes a parameter relating to an input field.

10. The method of claim 1, wherein said input specification includes a specification of an input from a hardware authentication device.

11. A system, comprising:
a processor configured to:
receive request data, wherein said request data includes identity-related information relating to a provider of said request data and information relating to an input specification;
request secure data entry via a programmatic interface; and
receive input data, wherein said input data is associated with said input specification, wherein said input data is encrypted, and wherein a key used for said encryption is associated with said identity-related information; and
a memory coupled with the processor, wherein the memory provides instructions to the processor.

12. The system of claim 11, wherein said programmatic interface is associated with an operating system call.

13. The system of claim 11, wherein said programmatic interface is associated with an API.

14. The system of claim 11, wherein said programmatic interface is associated with a specification in an electronic document.

15. The system of claim 11, wherein said key is a public key, and wherein said input data is encrypted with public-key encryption using said key.

16. The system of claim 11, wherein said key is a public key, and wherein said input data is encrypted with symmetric encryption using a second key, wherein said second key is encrypted with public-key encryption using said key, and wherein said encrypted second key is received with said input data.

17. The system of claim 11, wherein said identity-related information is associated with a cryptographically signed certificate.

18. The system of claim 11, wherein said input specification includes HTML.

19. The system of claim 11, wherein said input specification includes a parameter relating to an input field.

20. The system of claim 11, wherein said input specification includes a specification of an input from a hardware authentication device.

21. A computer program product, said computer program product being embodied in a non-transitory computer readable medium and comprising computer instructions for:
receiving request data, wherein said request data includes identity-related information relating to a provider of said request data and information relating to an input specification;
at a computing device, requesting secure data entry via a programmatic interface; and
receiving input data, wherein said input data is associated with said input specification, wherein said input data is encrypted, and wherein a key used for said encryption is associated with said identity-related information.

22. The computer program product of claim 21, wherein said programmatic interface is associated with an operating system call.

23. The computer program product of claim 21, wherein said programmatic interface is associated with an API.

24. The computer program product of claim 21, wherein said programmatic interface is associated with a specification in an electronic document.

25. The computer program product of claim 21, wherein said key is a public key, and wherein said input data is encrypted with public-key encryption using said key.

26. The computer program product of claim 21, wherein said key is a public key, and wherein said input data is encrypted with symmetric encryption using a second key, wherein said second key is encrypted with public-key encryption using said key, and wherein said encrypted second key is received with said input data.

27. The computer program product of claim 21, wherein said identity-related information is associated with a cryptographically signed certificate.

28. The computer program product of claim 21, wherein said input specification includes HTML.

29. The computer program product of claim 21, wherein said input specification includes a parameter relating to an input field.

30. The computer program product of claim 21, wherein said input specification includes a specification of an input from a hardware authentication device.

* * * * *